United States Patent
Miyashita (10) Patent No.: US 7,188,989 B2
(45) Date of Patent: Mar. 13, 2007

(54) LIGHT GUIDE PLATE AND SUPPORT UNIT FOR THE SAME

(75) Inventor: Shinichi Miyashita, Yamanashi (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 207 days.

(21) Appl. No.: 10/739,004

(22) Filed: Dec. 19, 2003

(65) Prior Publication Data
US 2004/0130912 A1   Jul. 8, 2004

(30) Foreign Application Priority Data
Dec. 20, 2002   (JP) ............................... 2002-369364

(51) Int. Cl.
*F21V 7/04*   (2006.01)
(52) U.S. Cl. ........................ 362/621; 362/625; 362/629
(58) Field of Classification Search .................. 362/26, 362/27, 31, 320, 309, 559–561, 800, 812, 362/608, 615, 616, 621, 625, 629; 349/58, 349/63, 64, 65, 70
See application file for complete search history.

(56) References Cited

U.S. PATENT DOCUMENTS

| | | | | |
|---|---|---|---|---|
| 5,027,258 A | * | 6/1991 | Schoniger et al. ............. | 362/31 |
| 5,392,199 A | * | 2/1995 | Kashima et al. ............... | 362/31 |
| 5,558,420 A | * | 9/1996 | Oki et al. ....................... | 362/31 |
| 5,967,637 A | * | 10/1999 | Ishikawa et al. ............... | 362/31 |
| 5,990,989 A | * | 11/1999 | Ozawa .......................... | 349/61 |
| 6,123,430 A | * | 9/2000 | Ono et al. ..................... | 362/31 |
| 6,164,789 A | * | 12/2000 | Unger et al. .................. | 362/31 |
| 6,247,826 B1 | * | 6/2001 | Funamoto et al. ............ | 362/31 |
| 6,402,335 B1 | * | 6/2002 | Kalantar et al. ............... | 362/31 |
| 6,502,947 B2 | * | 1/2003 | Matsumoto et al. .......... | 362/31 |
| 6,508,564 B1 | * | 1/2003 | Kuwabara et al. ............ | 362/31 |
| 6,561,665 B1 | * | 5/2003 | Kim ............................. | 362/31 |
| 2002/0141194 A1 | * | 10/2002 | Wortman et al. ........... | 362/309 |

FOREIGN PATENT DOCUMENTS

JP           07-114024        5/1995

* cited by examiner

Primary Examiner—Stephen Husar
Assistant Examiner—Hargobind S. Sawhney
(74) Attorney, Agent, or Firm—Browdy and Neimark, PLLC (57) ABSTRACT

The light guide plate 32 has a light receiving portion 36 on one side thereof to receive light emitted by the LED 24 and a flexible light guide body 35 for transforming the light received by the light receiving portion 36 into planar light. The light guide body 35 is arranged along the liquid crystal panel 23 and has a plurality of light scattering portions 30 arranged on an outer surface thereof in a propagation direction of light emitted by the LED 24. Since the light guide plate 32 comprises a flexible member and thus can be arranged in a curved shape conforming to the liquid crystal panel 23 having a curved surface portion, the curved surface portion of the liquid crystal panel 23 can be illuminated uniformly. Further, the provision of the light scattering portions 30 can enhance a light reception efficiency and light emission efficiency even if the light guide plate 32 is thin.

11 Claims, 14 Drawing Sheets

LIGHT GUIDE PLATE AND SUPPORT UNIT FOR THE SAME

BACKGROUND OF THE INVENTION

1. Field of the Invention

The present invention relates to a light guide plate and a support unit for the light guide plate to illuminate a liquid crystal panel as an image display body used in mobile phones and portable information terminals.

2. Description of the Prior Art

Display units such as a liquid crystal display have been using a backlight device to illuminate a display surface. The backlight device comprises a light guide plate installed at the back of the liquid crystal panel and a light source such as a light emitting diode (LED) or a cold-cathode tube arranged on one side of the light guide plate. Such a backlight device has an advantage of being able to reduce its overall thickness because the light source is arranged on one side of the light guide plate to emit light into the light guide plate from one side surface thereof. This construction in which the thin light guide plate receives light from its side, however, results in a poor light receiving efficiency.

Practices generally employed to improve the light receiving, efficiency involves enhancing an intensity of light emitted from the light source or arranging the light source close to the light guide plate. As disclosed in Japanese Patent Disclosure No. 7-114024, it has been proposed that a condenser lens be arranged between the light source and the side surface of the light guide plate to efficiently introduce light from the light source into the light guide plate.

In a backlight structure such as disclosed in the above official gazette, however, a separate condenser lens needs to be installed in the device, which increases not only the number of parts and the cost but also the number of manufacturing steps due to additional adjustments of shape and arrangement of the lens.

Further, a space required to accommodate the condenser lens limits a reduction in the thickness of the backlight device.

There is another problem. When light is introduced into the light guide plate from its side, brightness unevenness occurs in the light guide plate, with the brightness being highest at portions close to the light source and progressively decreasing with an increasing distance from the light source.

Further, conventional light guide plates are generally made of a hard material such as acrylic plate and shaped like a flat plate. Thus, it cannot illuminate a display with a curved surface uniformly.

SUMMARY OF THE INVENTION

A first object of the present invention is to provide a light guide plate which, if a display body such as a liquid crystal panel has a curved surface portion, can be freely deformed and arranged along the curved surface portion of the display body.

A second object of the present invention is to provide a light guide plate which, even if its thickness is reduced, can enhance a light reception efficiency and light emission efficiency.

A third object of the present invention is to provide a light guide plate support unit which can easily and reliably support a light guide plate while at the same time enhancing the light reception efficiency of the light guide plate.

To achieve the above objectives, the light guide plate of this invention comprises: a light receiving portion on one side of the light guide plate to receive light emitted by a light source; and a light guide body to transform the light received by the light receiving portion into planar light; wherein the light guide body comprises a flexible member and arranged along the display body and has a plurality of light scattering portions arranged on an outer surface thereof in a propagation direction of light emitted by the light source.

With this light guide plate, since the light guide body comprises a bendable, flexible member, it can be arranged to conform to the contour of a display body with a curved surface portion, such as a liquid crystal panel. It is therefore possible to illuminate the curved surface portion of the display body uniformly.

The flexible member of this invention includes, for example, transparent or translucent, thin sheet member comprising polyethylene terephthalate, silicone or polyimide.

Since the light guide body of this invention has light scattering portions arranged on at least an outer surface thereof facing the display body or an outer surface thereof on its back side, even if the light guide plate is formed thin, the light emission efficiency can be enhanced by the light diffusion effect of the light scattering portions. The light scattering portions of this invention may, for example, be formed by a plurality of undulated surface portions or through-holes that partially refract or reflect light. Further, by increasing the arrangement density of the undulated surface portions as they are further away from a light source, it is possible to eliminate brightness unevenness that would deteriorate with an increasing distance from the light source.

Further, in other embodiments of this invention, to enhance the light receiving efficiency of the light guide plate, the light receiving portion is constructed of an enlarged light receiving face and a light introducing portion, the enlarged light receiving face being formed on one side surface of the light guide body by progressively increasing the thickness of the light guide body toward that side, the light introducing portion progressively converging from the enlarged light receiving face toward the light guide body.

Further, the similar effect can also be expected to be produced by cutting a V-shaped notch in the enlarged light receiving face to reflect or refract the light emitted from the light source in many directions.

The light guide plate support unit of this invention comprises: a light guide plate having a light receiving portion on one side thereof to receive light emitted from a light source and a light guide body comprising a flexible member to transform the light received by the light receiving portion into planar light and illuminate a display body with the planar light, the light guide body having a plurality of light scattering portions arranged on an outer surface thereof; and a clamp portion having a substrate mounting a light source and a support portion projecting from the substrate in a light emission direction of the light source to support the one side surface of the light guide plate.

The clamp portion may comprise a transparent resin material or a transparent resin material containing a fluorescent material to allow light from the light emitting element to enter the light receiving surface of the light guide efficiently. Further, arranging a light shielding member on upper and lower surfaces of the clamp portion can eliminate a possible leakage of light, preventing it from diffusing in other than the light receiving surface of the light guide.

DETAILED DESCRIPTION OF PREFERRED EMBODIMENTS

Now, embodiments of a light guide plate and a light guide plate support unit according to this invention will be explained in detail by referring to the accompanying drawings.

Figure 1:
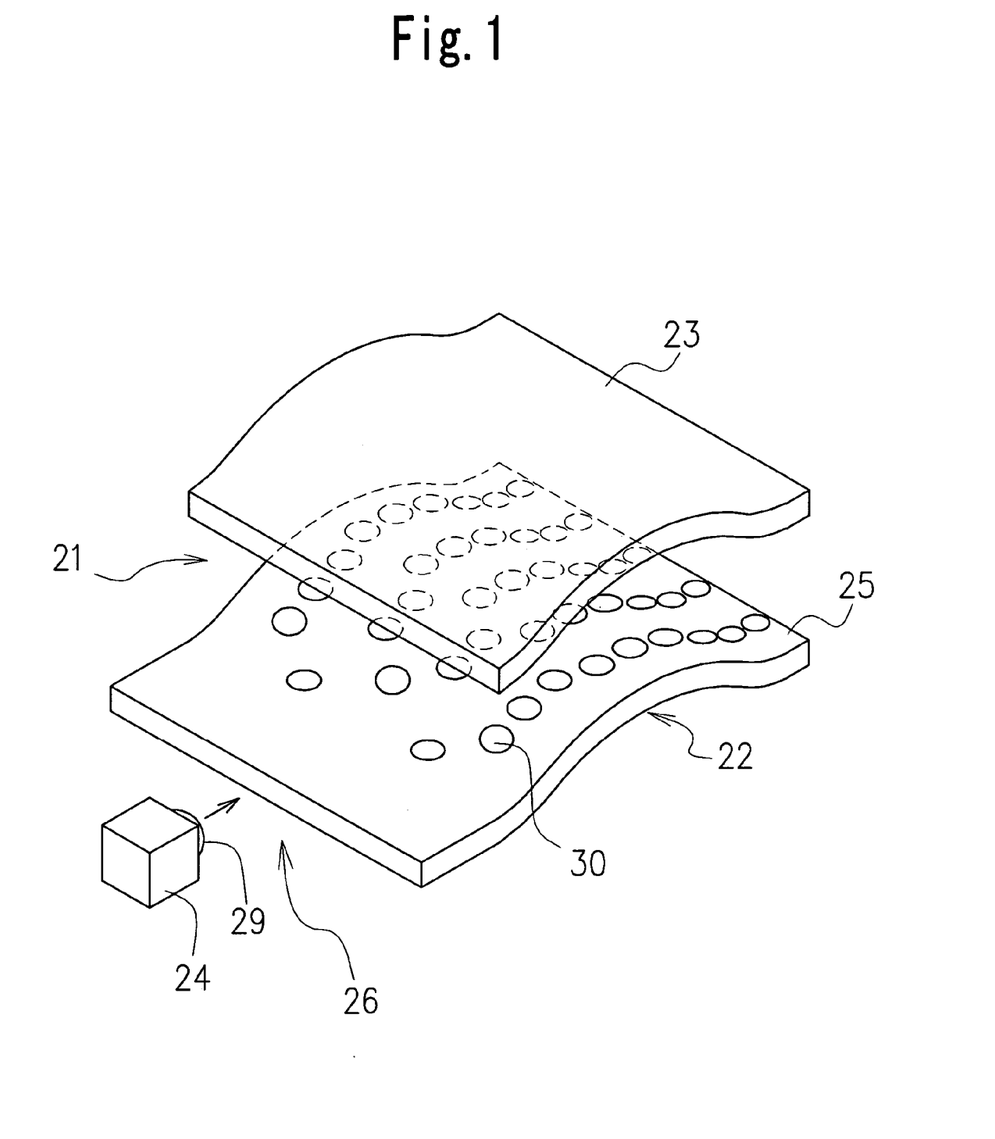
FIG. 1 is an exploded perspective view of a display incorporating a light guide plate according to a first embodiment of the present invention.

FIG. 1 shows a construction of a display 21 having a light guide plate 22 according to a first embodiment of the invention. The display 21 comprises a liquid crystal panel 23 as a display body, a light guide plate 22 arranged on the back side of the liquid crystal panel 23, and a light source (LED 24) arranged close to one side surface of the light guide plate 22.

The liquid crystal panel 23 has a curved surface conforming to the shape of an electronic device on which it is mounted. The light guide plate 22 is also curved to match that shape. The light guide plate 22 comprises for example a flexible, transparent or translucent sheet member, such as polyethylene terephthalate (PET), silicone or polyimide, about 0.1 mm thick and is bendable into any desired shape. The light guide body 25 forming the light guide plate 22 has formed on its upper surface facing the liquid crystal panel 23 a plurality of light scattering portions 30 to scatter light toward the liquid crystal panel 23.

In the display 21 of the above construction, light radiated from a light emitting surface 29 of the LED 24 as a point light source enters the light guide plate 22 through one side surface (light receiving portion 26) thereof, which in turn emits light from its entire surface to illuminate the liquid crystal panel 23. At this time, since the light guide plate 22 is deformable, it can be arranged to conform to a contour of the back surface of the liquid crystal panel 23. Further, the light scattering portions 30 formed on the upper surface of the light guide body 25 can compensate for an insufficient light quantity of LED 24, leakage of received light and attenuation of light intensity that deteriorates with an increasing distance from the LED 24, thus increasing the brightness of the light guide plate 22 and therefore the brightness of the liquid crystal panel 23. Further, a provision of a light reflecting member, such as white paint and plating, on side and back surfaces of the light guide plate 22 excluding the light receiving portion 26 can enhance an efficiency of light radiation onto the liquid crystal panel 23 and thereby increase an overall brightness of the panel.

Figure 2:
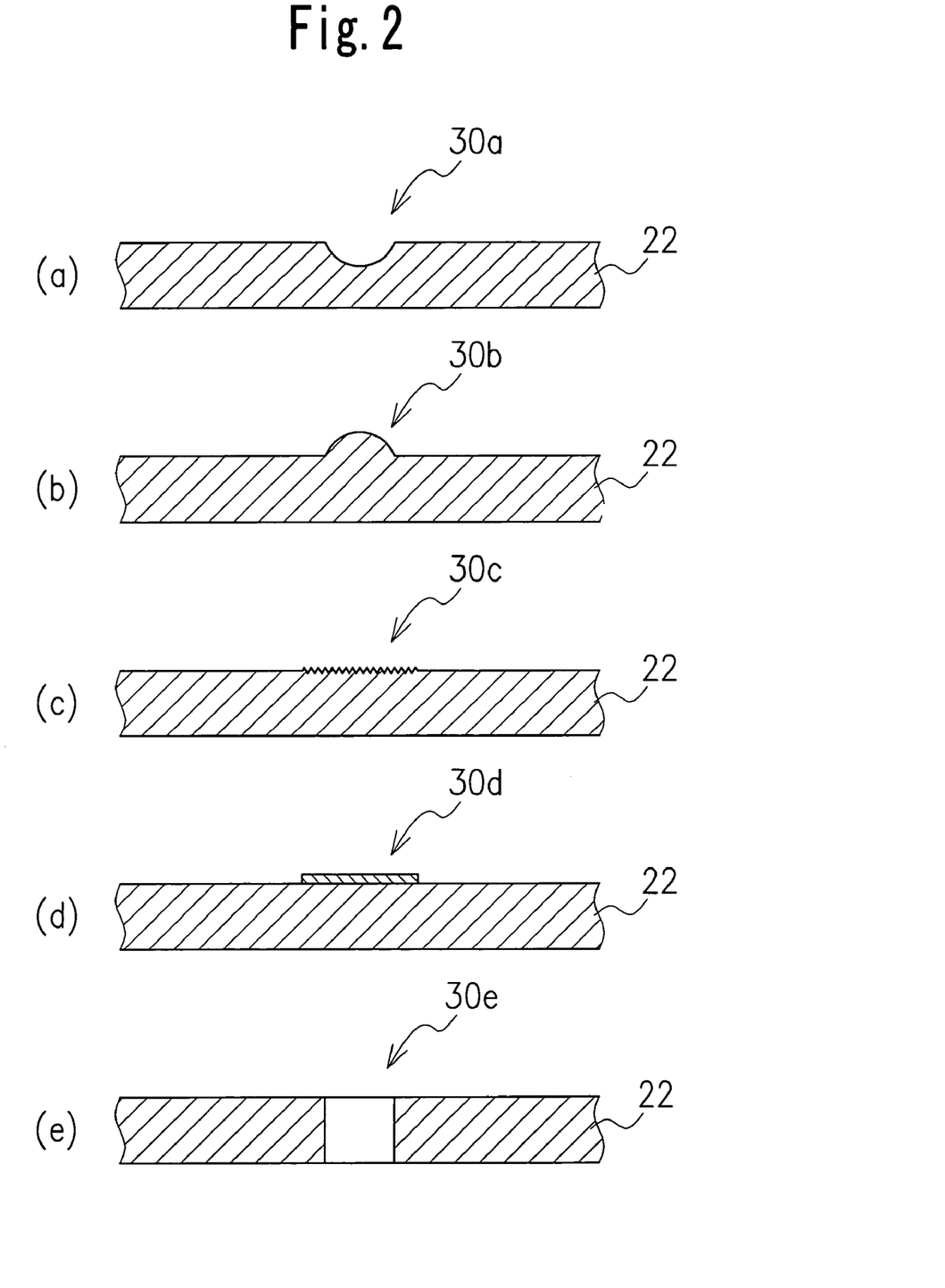
FIG. 2 is cross-sectional views of a variety of light scattering portions provided on the light guide plate.
Figure 3:
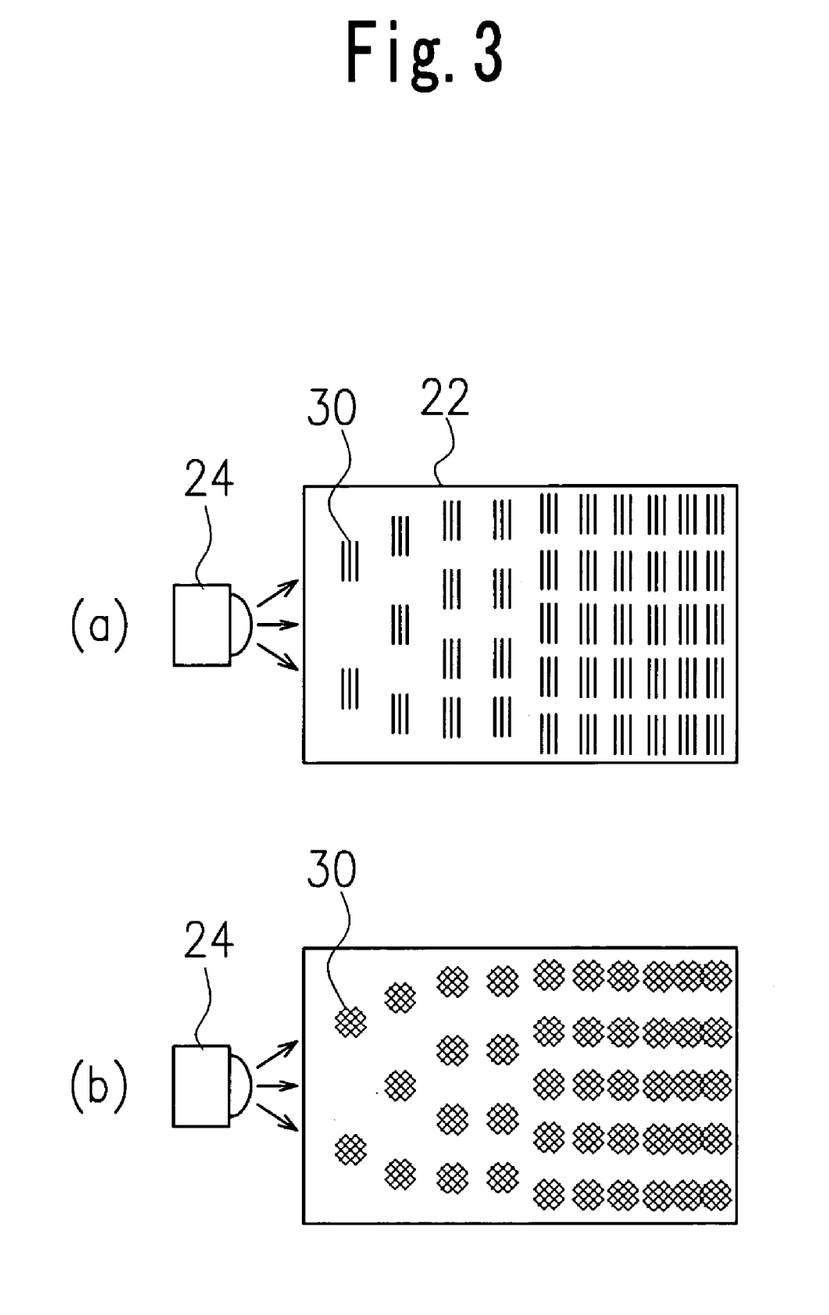
FIG. 3 is a plan view showing an example arrangement of the light scattering portions.

The light scattering portions 30 are formed by directly forming dented portions 30a, bulged portions 30b or fine grooves 30c in the surface of the light guide plate 22 as shown in FIGS. 2(a), 2(b) and 2(c) or by bonding a light diffusing sheet 30d mixed with a light diffusing agent to the light guide plate surface as shown in FIG. 2(d). It is also possible to partially enhance the brightness by forming through-holes 30e in the light guide plate 22, as shown in FIG. 2(e), to utilize refraction or reflection of light by these holes. Although the light scattering portions 30 are each shown in FIG. 1 to have a circular pattern, it is also possible to form them in a line pattern as shown in FIG. 3(a) or check pattern as shown in FIG. 3(b). Further, by increasing the size and arrangement area of the light scattering portions 30 and narrowing their intervals as they are farther away from the LED 24, the intensity of light thrown onto the liquid crystal panel 23 can be uniformalized.

While in the above embodiment the light guide plate 22 has been described to be arranged on the back side of the liquid crystal panel 23, if a transparent light guide plate 22 is used, it may be placed on the upper surface side of the liquid crystal panel 23.

Further, in the above embodiment the light scattering portions 30 have been described to be placed on the upper surface of the light guide body 25, i.e., an outer surface facing the liquid crystal panel 23, they may also be provided on a back outer surface or both surfaces of the light guide body 25.

Figure 4:
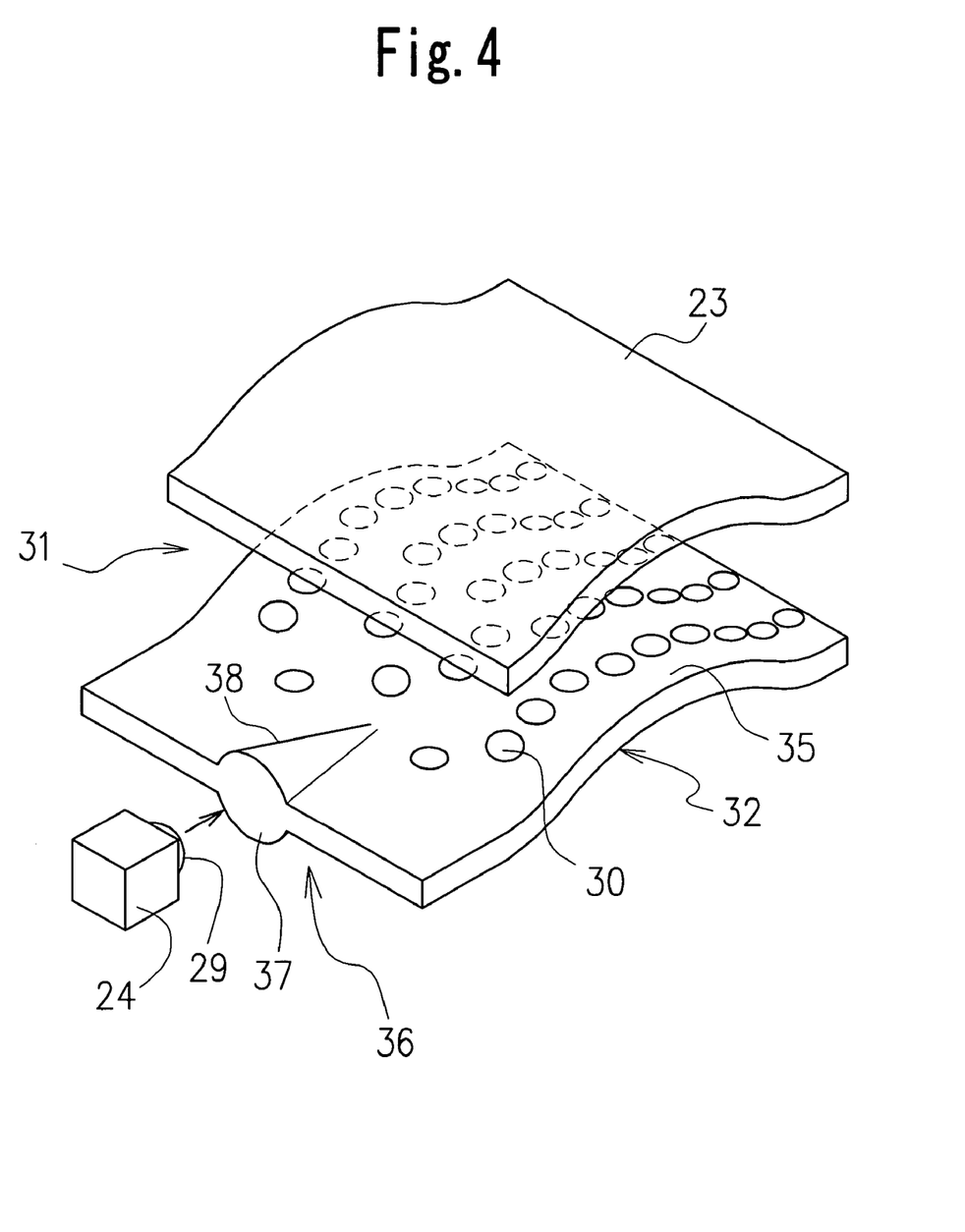
FIG. 4 is an exploded perspective view of a display incorporating a light guide plate according to a second embodiment of the present invention.
Figure 5:
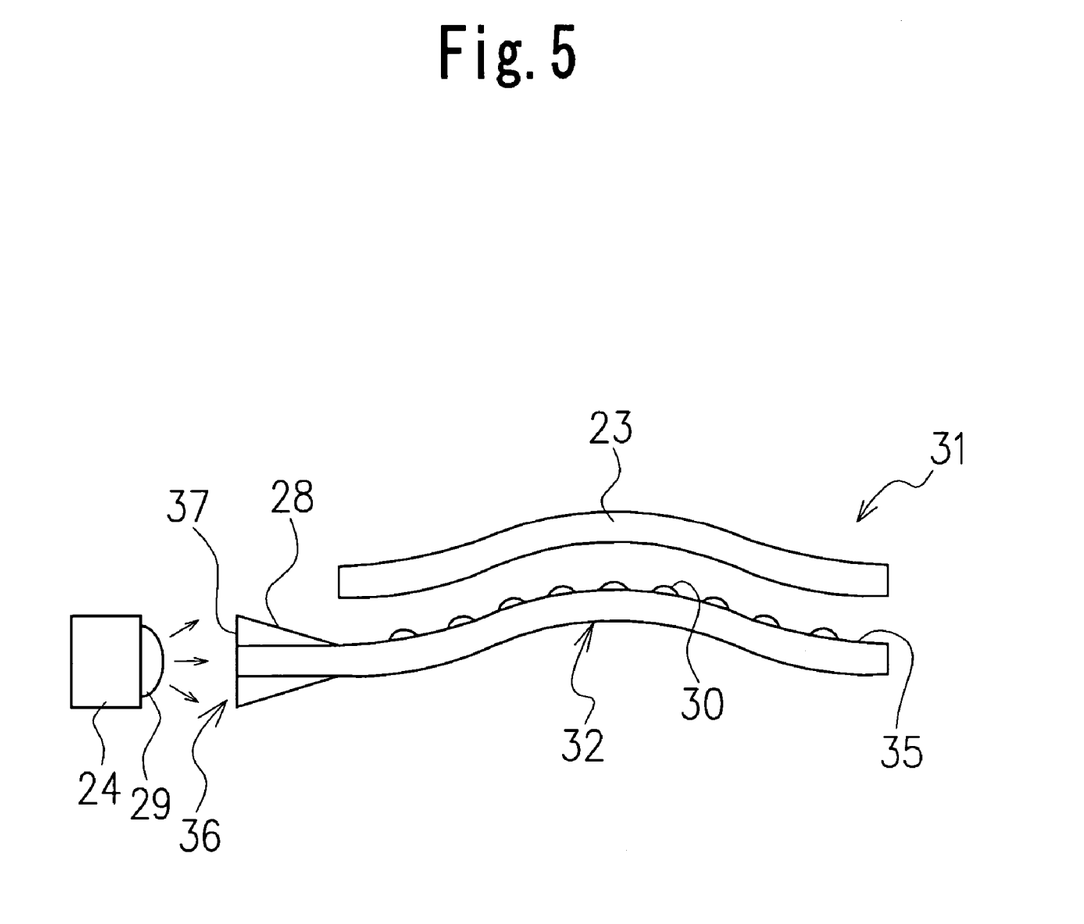
FIG. 5 is a side view of the display of FIG. 4.

FIG. 4 and FIG. 5 illustrate the construction of a display 31 incorporating a light guide plate 32 according to a second embodiment of the invention. The light guide plate 32 of this embodiment comprises a thin light guide body 35 made of a flexible sheet member of the first embodiment and a thick light receiving portion 36 formed on one side of the light guide body 35 to receive light from the LED 24.

The light receiving portion 36 comprises an enlarged, circular, planar light receiving face 37, which is formed on one side surface of the light guide body 35 by progressively increasing the thickness of the light guide body 35, and a conical light introducing portion 38 which converges from the enlarged light receiving face 37 to a point in the light guide body 35. The diameter of the enlarged light receiving face 37 can be set appropriately according to the size of the LED 24. When the light guide body 35 is 0.1 mm thick for example, the diameter of the enlarged light receiving face 37 is preferably set to 0.3 mm or more.

As shown in FIG. 5, the light guide plate 32 is arranged so that a center of the enlarged light receiving face 37 almost aligns with a center of the light emitting surface 29 of the LED 24. Light emitted from the light emitting surface 29 of the LED 24 is radiated onto the enlarged light receiving face 37 and introduced through the conical light introducing portion 38 into the light guide body 35 where it is diffused. The provision, on one side surface of the light guide body 35, of the enlarged light receiving face 37 of almost the same area as that of the light emitting surface 29 of the LED 24 ensures that light emitted from the LED 24 can be taken into the light guide plate 32 without leakage. Thus, if the light guide body 35 is formed by a thin sheet member, it is now possible to illuminate its surface uniformly and brightly without decreasing a light quantity.

The light guide plate 32 shown represents an example configuration where a single LED 24 is used. Depending on the kind, shape or mode of use of a light source as a backlight, a variety of configurations can be employed. Other embodiments of the light guide plate will be explained by referring to FIGS. 6 to 8.

Figure 6:
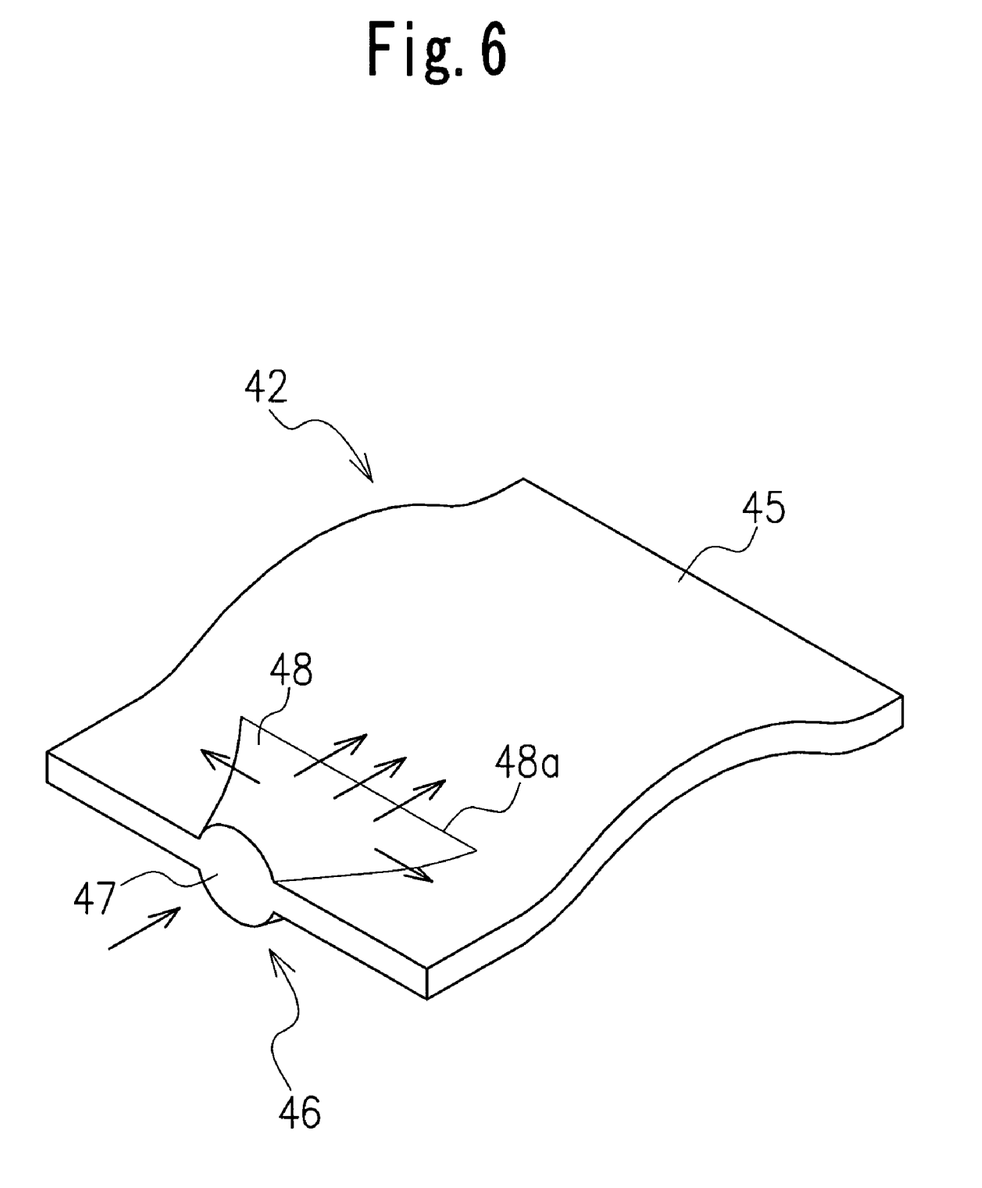
FIG. 6 is a perspective view of a light guide plate according to a third embodiment of the present invention.

FIG. 6 shows a light guide plate 42 as a third embodiment of the invention. As shown in the figure, a light receiving portion 46 of the light guide plate 42 formed of a flexible sheet member has an enlarged light receiving face 47 of almost the same circular shape as the enlarged light receiving face 37 of the light guide plate 32. The light receiving portion 46 also has a fan-shaped light introducing portion 48 progressively expanding left and right as it extends from the enlarged light receiving face 47 into a light guide body 45 toward the opposite side. The light receiving portion 46 of this embodiment allows the light introducing portion 48 to be expanded left and right more than the light receiving portion 36 of the light guide plate 32 of the second embodiment, so the light that has entered through the enlarged light receiving face 47 can be diffused into the light guide body 45 more widely. Further, since a front end 48a of the light introducing portion 48 is wide and almost parallel to the enlarged light receiving face 47, light received through the enlarged light receiving face 47 can be diffused from the front end 48a of the light introducing portion 48 into a wider range of the light guide body 45.

Figure 7:
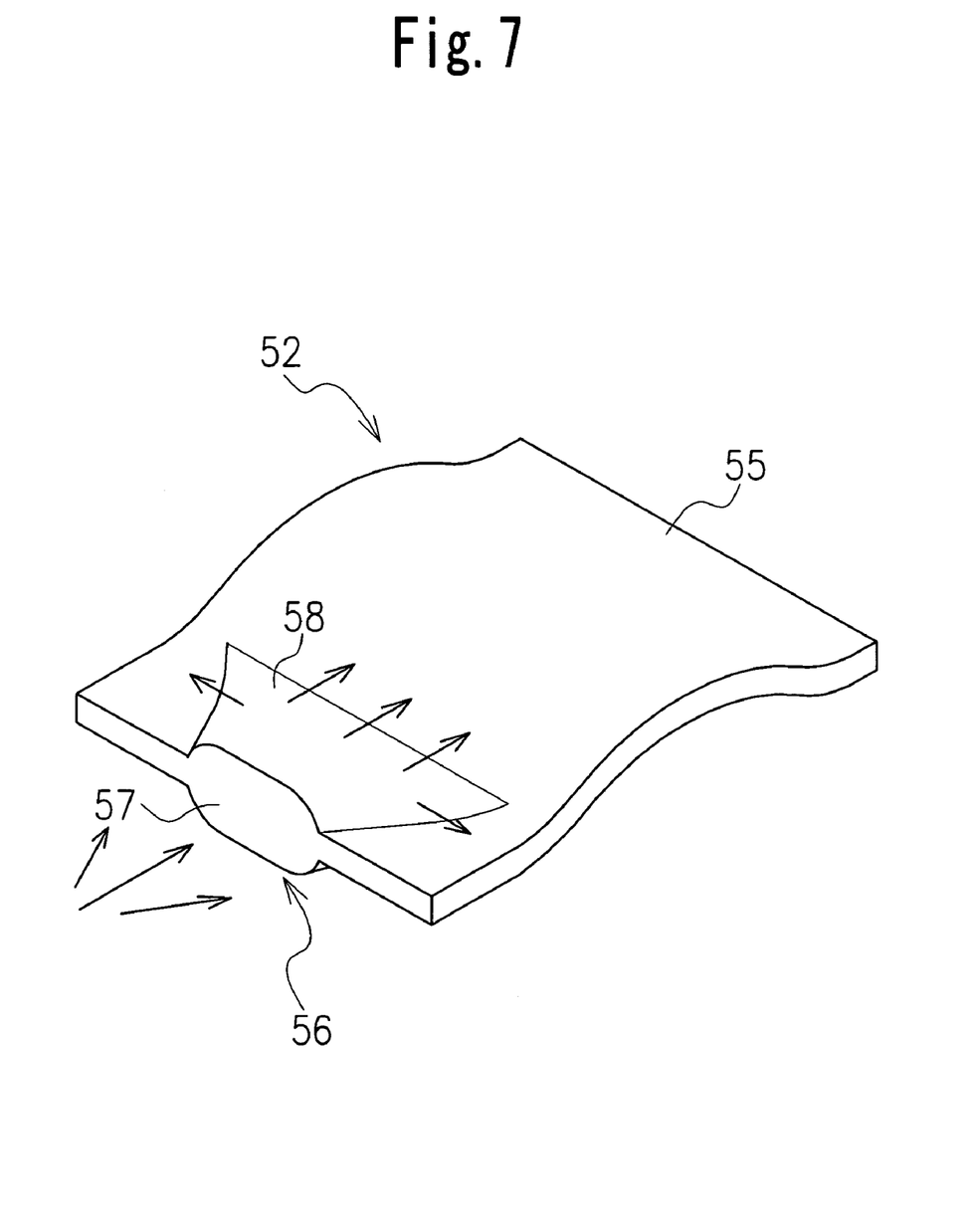
FIG. 7 is a perspective view of a light guide plate according to a fourth embodiment of the present invention.

FIG. 7 shows a light guide plate 52 according to a fourth embodiment of this invention. As shown in the figure, a light receiving portion 56 of the light guide plate 52 has an enlarged light receiving face 57 of a laterally elongate, oval shape. As in the preceding embodiment, the light receiving portion 56 also has a light introducing portion 58 that expands left and right as it extends from the enlarged light receiving face 57 into a light guide body 55. With this light guide plate 52, since the enlarged light receiving face 57 is horizontally wide, light can effectively be introduced into the light guide body 55 without leakage even when a relatively large LED is used.

Figure 8:
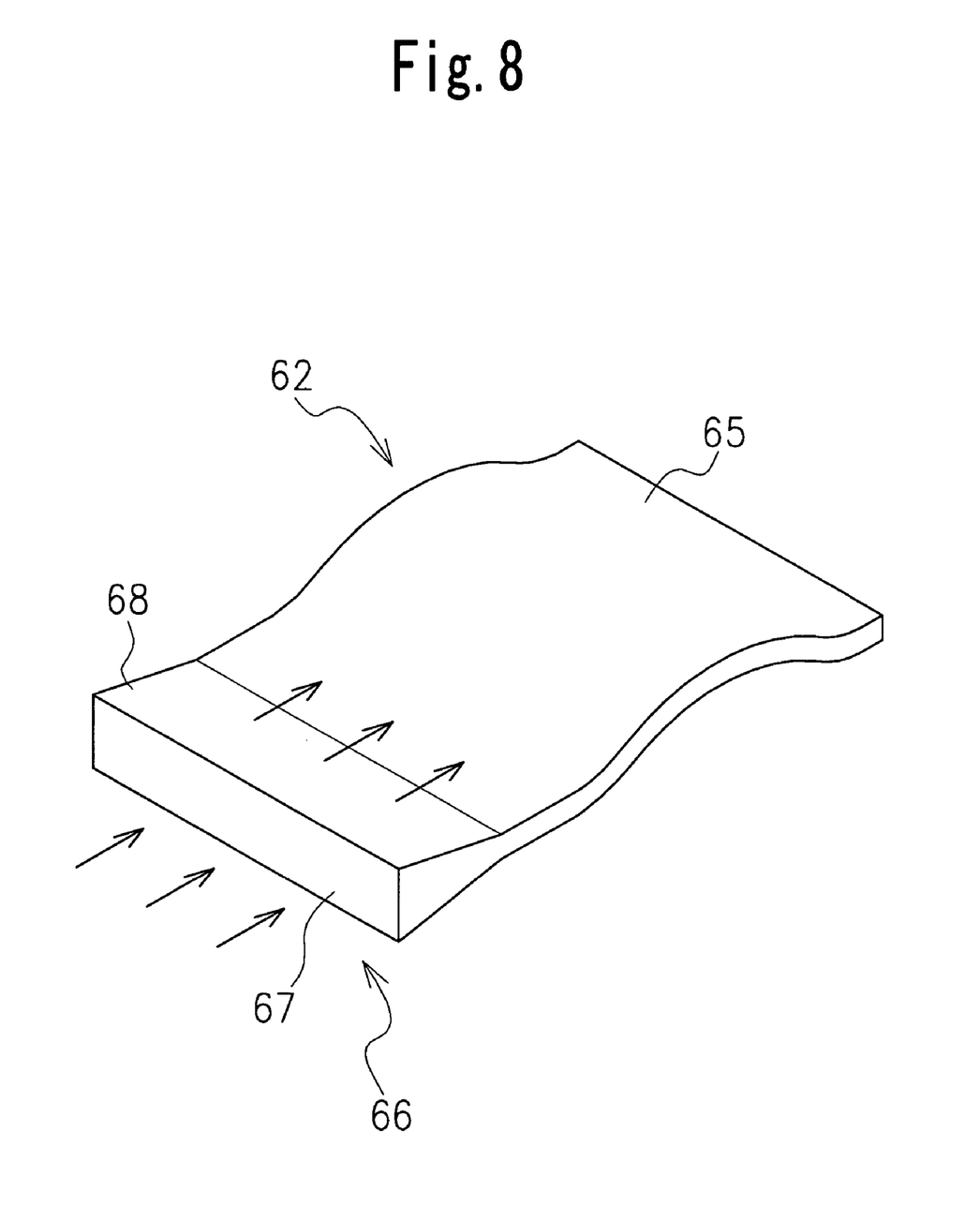
FIG. 8 is a perspective view of a light guide plate according to a fifth embodiment of the present invention.

FIG. 8 shows a light guide plate 62 according to a fifth embodiment of the invention. As shown in the figure, a light receiving portion 66 of the light guide plate 62 has a rectangular, enlarged light receiving face 67 formed by increasing the thickness of a light guide body 65 at one side surface uniformly over the entire depth. The light receiving portion 66 also has a light introducing portion 68 which is tapered moderately to reduce its thickness toward the light guide body 65. Since the enlarged light receiving face 67 is formed over the entire side surface of the light guide body 65, it is possible to arrange a plurality of LEDs along the enlarged light receiving face 67 or use a barlike fluorescent lamp instead of the LEDs. This configuration is particularly suited where a large quantity of light needs to be taken in. Rays of light, emitted uniformly from a plurality of LEDs or barlike fluorescent lamp and entering the enlarged light receiving face 67 parallel thereto, pass through the light introducing portion 68 and are diffused into the light guide body 65, thus uniformly illuminating the light guide body 65.

Figure 9:
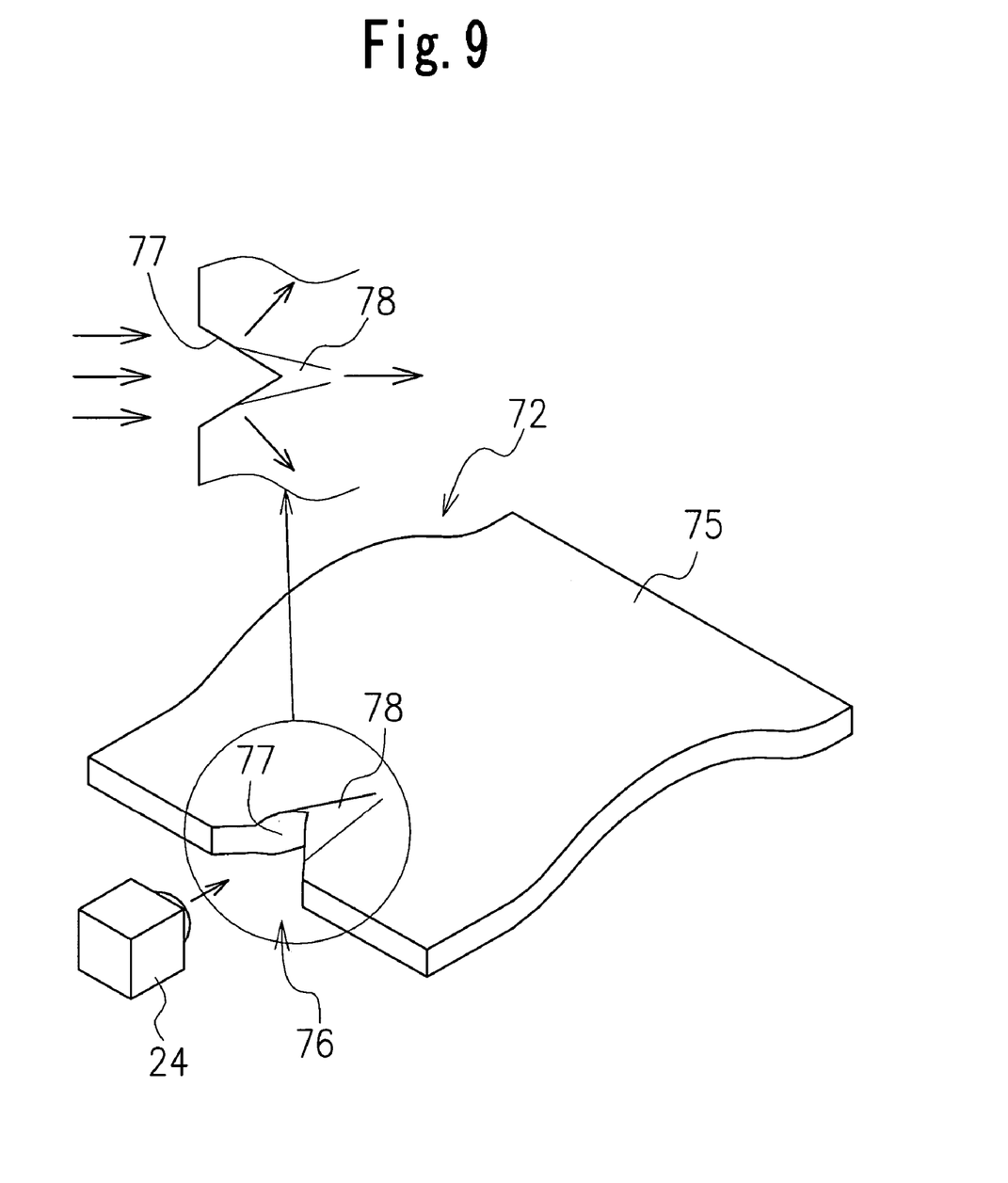
FIG. 9 is a perspective view of a light guide plate according to a sixth embodiment of the present invention.
Figure 10:
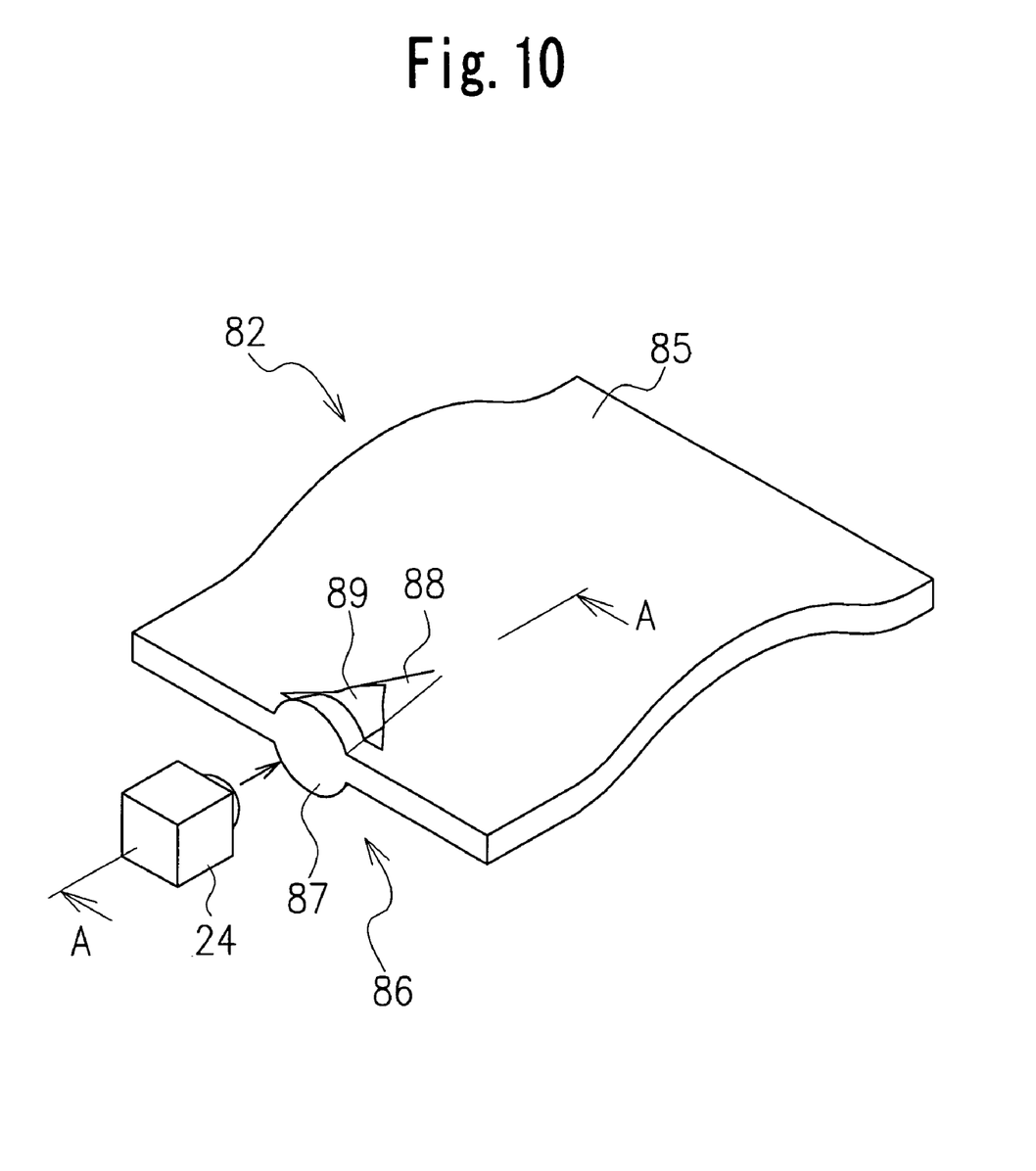
FIG. 10 is a perspective view of a light guide plate according to a seventh embodiment of the present invention.
Figure 11:
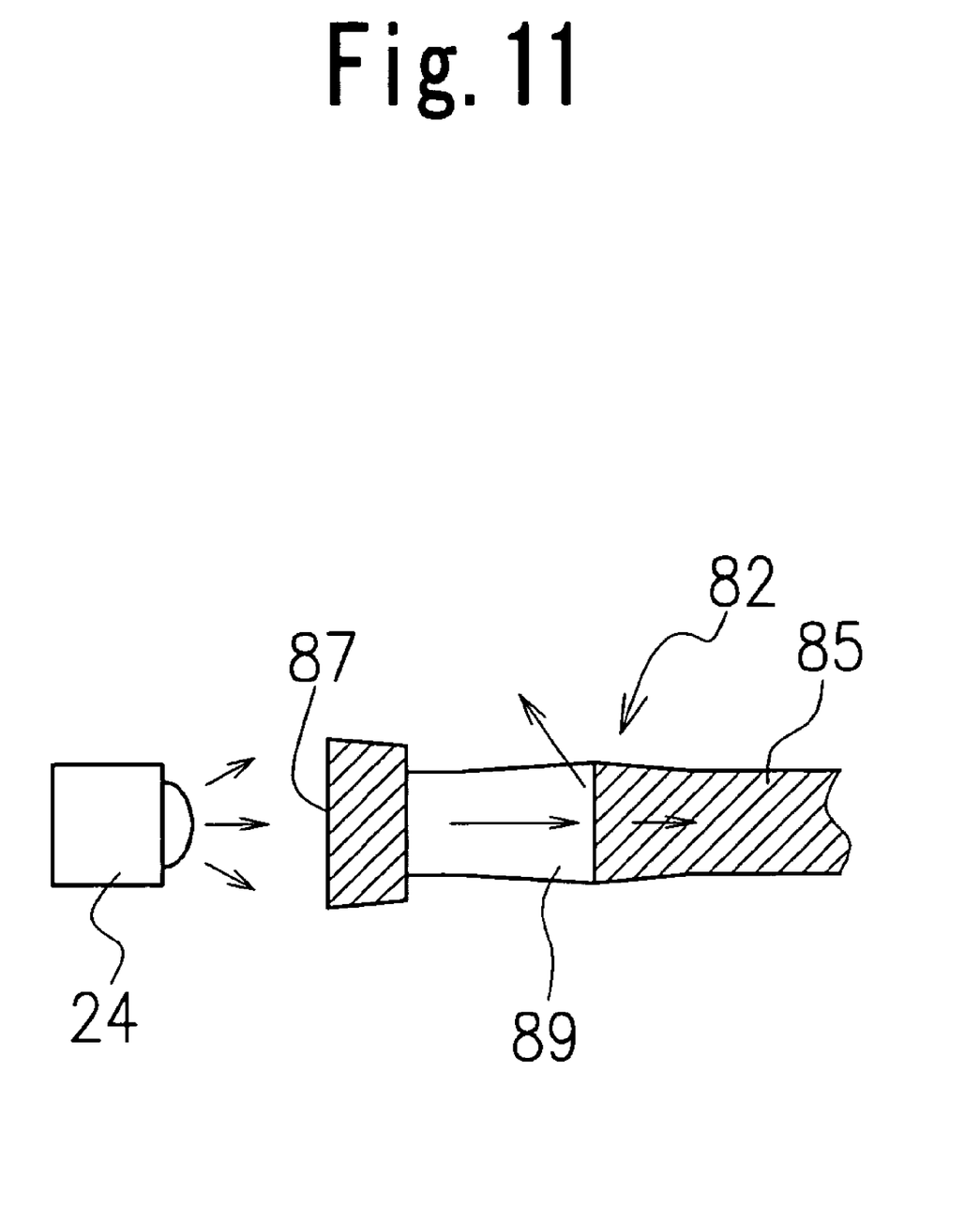
FIG. 11 is a cross-sectional view taken along the line A-A of FIG. 10.

FIGS. 9 to 11 show further embodiments in which a light guide plate with a thick light receiving portion has its light diffusing effect further improved. FIG. 9 represents a light guide plate 72 according to a sixth embodiment of the invention. The light guide plate 72 of this embodiment is made by cutting a V-shaped notch in the enlarged light receiving face and the light introducing portion of the light guide plate of the second embodiment to form a light receiving portion 76 having a V-shaped enlarged light receiving face 77 and a light introducing portion 78. Forming the light receiving portion 76 in a V shape can increase an area of the enlarged light receiving face 77 and change an incident angle of light from the LED 24 laterally by the V-shaped enlarged light receiving face 77, thus enhancing the light diffusion inside a light guide body 75.

FIG. 10 and FIG. 11 illustrate a light guide plate 82 according to a seventh embodiment of the invention. The light guide plate 82 has a light receiving portion 86 of the similar shape to that of the light receiving portion of the second embodiment. That is, the light receiving portion 86 comprises an enlarged, circular, planar light receiving face 87 and an almost conical light introducing portion 88 with a vertical through-hole 89 formed therein. With this construction, light received through the enlarged light receiving face 87 is reflected or refracted by an inner wall surface of the through-hole 89 and diffused into the light guide body 85.

It is also possible to give the light guide plate partial variations in the intensity of light emitted therefrom by forming light scattering portions 30 such as used in the first embodiment.

Figure 12:
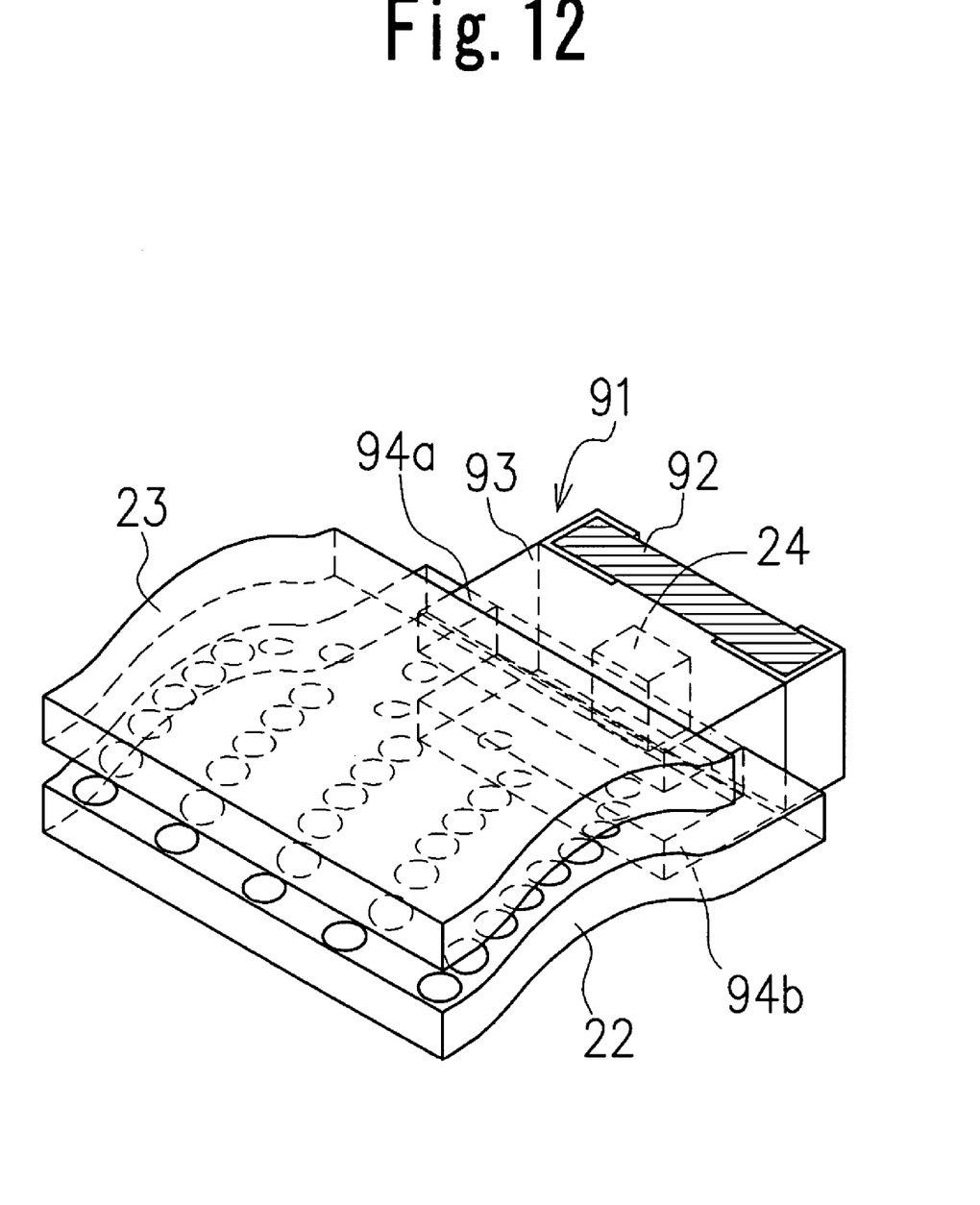
FIG. 12 is a perspective view showing a light guide plate and a light guide plate support unit made of a support member.
Figure 13:
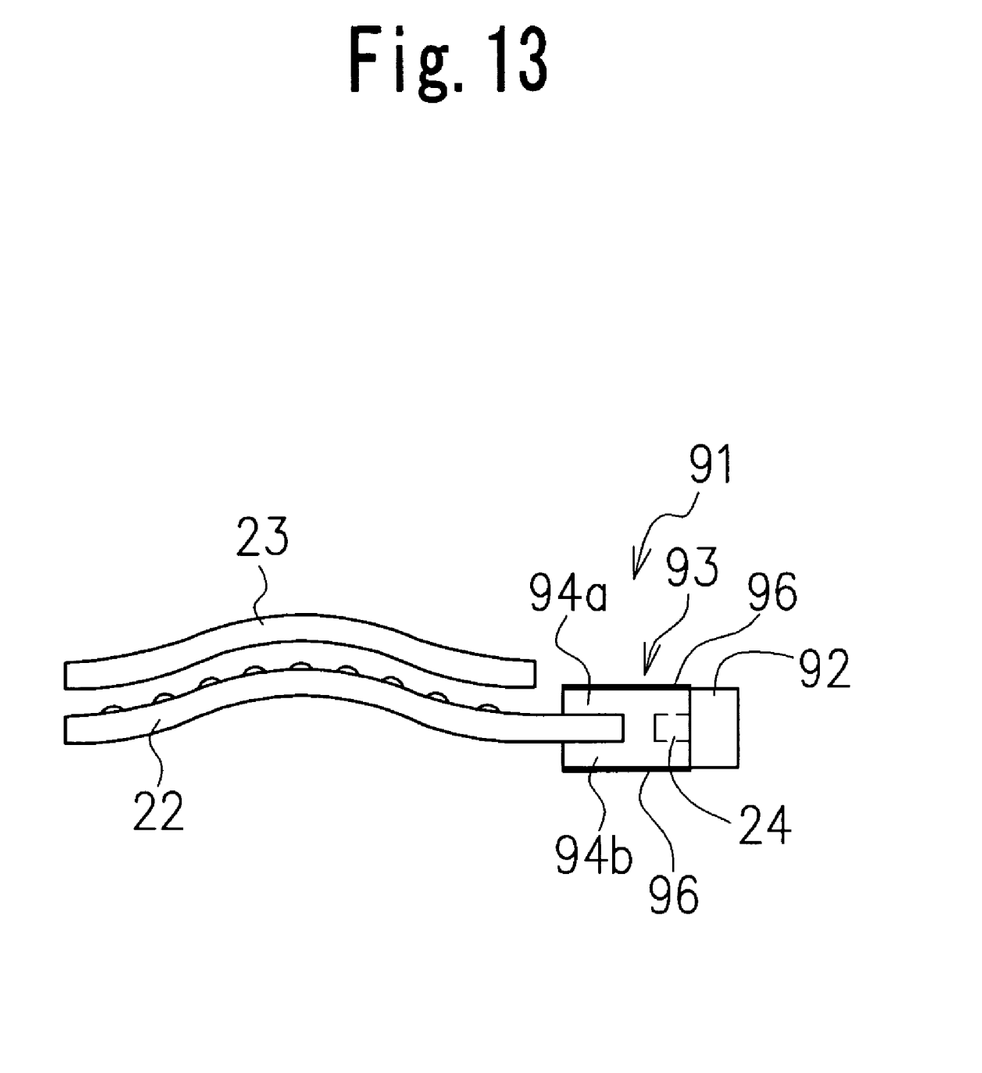
FIG. 13 is a side view of FIG. 12.

Next, we will describe a light guide plate support unit comprising a support member for supporting the light guide plate of each of the above embodiments in a package. FIG. 12 shows an example combination of the light guide plate 22 of the first embodiment and a light guide plate support unit having a support member 91 for supporting the light guide plate 22. The support member 91 comprises a substrate 92 mounting the LED 24 and a clamp portion 93 protruding from the substrate 92 to clamp the light guide plate 22. The substrate 92 comprises a glass epoxy resin and has a pair of electrode patterns (not shown) formed on its front surface, side surfaces and a part of back surface so that the LED 24 can be mounted on it. The clamp portion 93 comprises a transparent resin material in a shape of letter U and is integrally formed on the substrate 92. The clamp portion 93 has a pair of clamp plates 94a, 94b extending in a direction of light emitted from the LED 24 mounted on the substrate 92 and spaced from each other by a distance that will allow the light guide plate 22 to be inserted between them. Further, as shown in FIG. 13, light shielding members 96 that suppress diffusion of light are arranged on the top and bottom surfaces of the clamp portion 93 in order to radiate light from the LED 24 concentratedly onto the side surface of the light guide plate 22.

Since the support member 91 of the above construction has the paired clamp plates 94a, 94b secured thereto in such a manner that the LED 24 is located at a center between them, it is possible to align the illumination center of the LED 24 with the light receiving surface on the side surface of the light guide plate 22 by simply inserting the light guide plate 22 between the clamp plates 94a, 94b.

Figure 14:
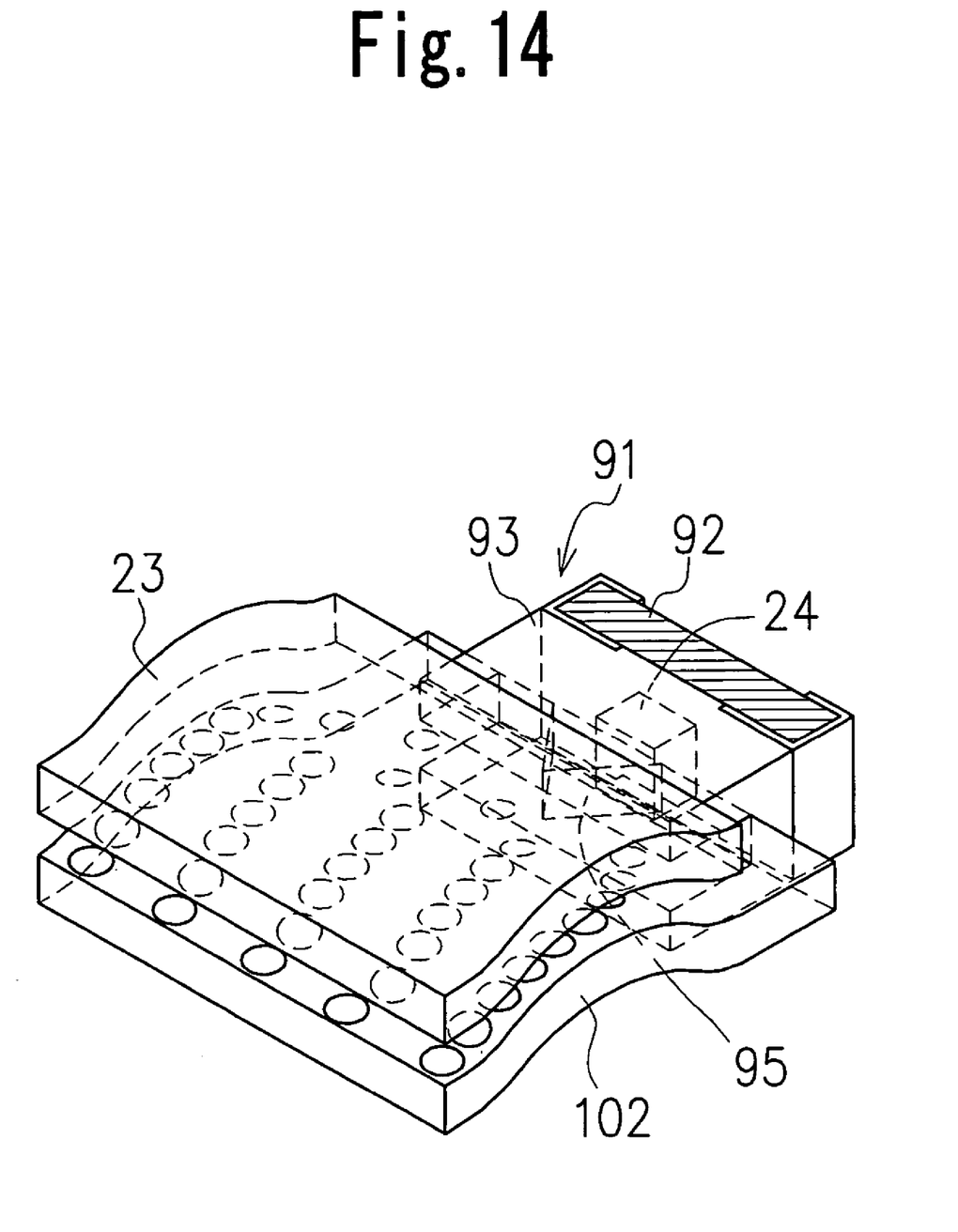
FIG. 14 is a perspective view showing a light guide plate formed with a notch in a light receiving surface and a light guide plate support unit made of a support member.

FIG. 14 shows an example in which a light guide plate 102 having a light diffusing V-shaped notch 95 in one side surface thereof is mounted on the support member 91. The use of the support member 91, as described above, makes easy and accurate the positional alignment between the light receiving surface formed with the notch 95 and the LED 24. Further, since the support member 91 supports the entire light guide plate in a cantilevered manner and since the supported portions illuminate, a wide light guide surface can be provided.

As explained above, since the light guide plate of this invention is formed of a flexible sheet member, it can be curved or bent to conform to the contour of the display body, such as a liquid crystal panel. This in turn allows the light guide plate to be arranged along a curved display body, illuminating the display body uniformly. Further, the provision of the enlarged light receiving face on the side surface of the light guide plate can prevent a possible reduction in a light receiving efficiency that would otherwise result if the light guide body is reduced in thickness.

Further, partially providing undulated portions or light diffusing members on the outer surface of the light guide body can make up for a reduction in light quantity that deteriorates with an increasing distance from a light source, thereby making the brightness of the entire light guide plate uniform.

Further, since a support member, which integrally incorporates a light source and a clamp portion for supporting one end of the light guide plate in a cantilevered manner, is used, not only can a thin guide plate be supported stably but the positioning of the light guide plate with respect to the light source can be facilitated.

What is claimed is:

1. A light guide plate comprising:
    a light receiving portion disposed adjacent a light source; and
    a light guide body extending from the light receiving portion and disposed adjacent a display body to be illuminated
    the light receiving portion having a light receiving surface disposed to face the light source and receiving light emitted from the light source,
    the light guide body including a light emitting surface disposed to face the display body and transforming light received by the light receiving surface into planar emission,
    wherein the light receiving portion and the light guide body comprise a single plate shaped member formed in a unit,
    wherein the light guide body has a constant thickness, and
    wherein said light receiving portion further includes a light introducing portion having a thickness that progressively decreases from said light receiving surface toward the light guide body, so that said light receiving surface has an enlarged form, the thickness of said light introducing portion is the same as the thickness of the light guide body at a boundary of the light introducing portion and the light guide body, and said enlarged light receiving surface is provided at a generally central part in a width direction of the light guide plate and over only a part of the width of the light guide plate.

2. A light guide plate according to claim 1, wherein the display body has a curved surface portion and the light guide body is arranged in a similar curved shape along the curved surface portion of the display body.

3. A light guide plate according to claim 1, wherein the light guide body has light scattering portions arranged on at least an outer surface thereof facing the display body or an outer surface thereof on a back side.

4. A light guide plate according to claim 3, wherein the light scattering portions comprise a plurality of undulated surface portions or through-holes that partially refract or reflect the light introduced into the light guide body, and the light scattering portions are arranged at an increasing arrangement density as they are further away from the light source.

5. A light guide plate according to claim 1, wherein the light guide body is a transparent or translucent, thin sheet member comprising polyethylene terephthalate, silicone or polyimide.

6. A light guide plate according to claim 1, wherein the at least the light guide body is flexible.

7. A light guide plate according to claim 1, wherein the enlarged light receiving face has a V-shaped notch provided in the light introducing portion and reflecting or refracting the light emitted from the light source.

8. A light guide plate according to claim 1, wherein the enlarged light receiving face has a through-hole provided in one portion of the light introducing portion and reflecting or refracting the light input in the light receiving surface.

9. A light guide plate according to claim 1, wherein the light receiving surface has a circular shape.

10. A light guide plate according to claim 1, wherein the light receiving surface has an oval shape.

11. A light guide plate according to claim 1, wherein the light receiving portion has a rectangular shape.

* * * * *